June 11, 1929.  C. W. RICE  1,717,263
SOUND REPRODUCER
Filed July 26, 1926
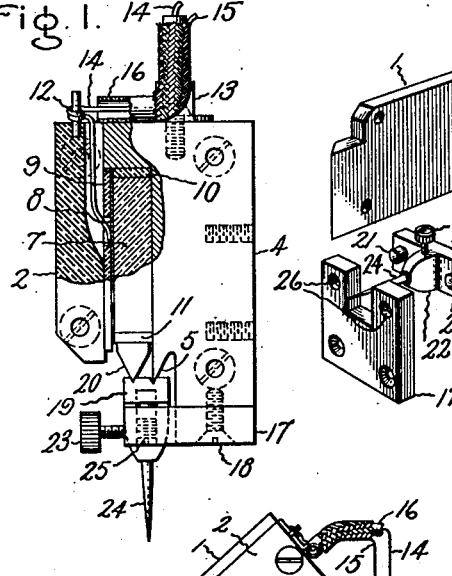
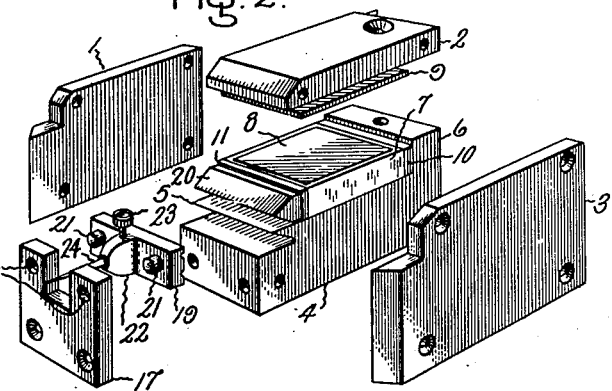
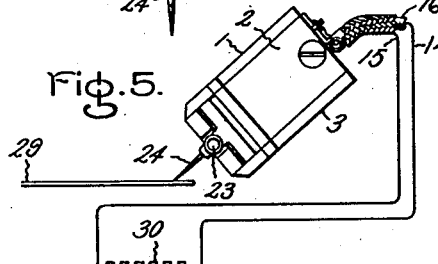
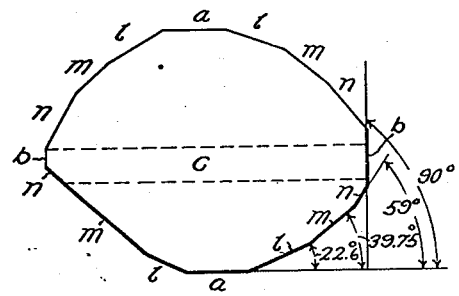
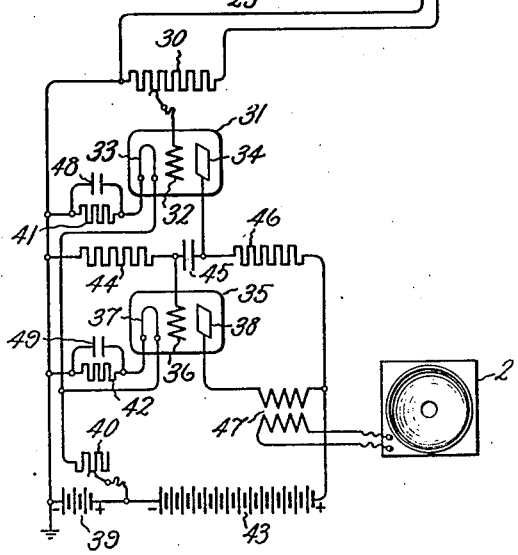
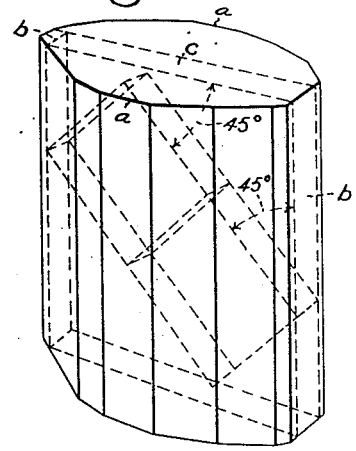
Inventor:
Chester W. Rice,
by
His Attorney.

Patented June 11, 1929.

1,717,263

UNITED STATES PATENT OFFICE.

CHESTER W. RICE, OF SCHENECTADY, NEW YORK, ASSIGNOR TO GENERAL ELECTRIC COMPANY, A CORPORATION OF NEW YORK.

SOUND REPRODUCER.

Application filed July 26, 1926. Serial No. 124,919.

My invention relates to devices for producing sound, and has for its principal object the provision of an improved pick-up device that is rugged in construction and is capable of accurately reproducing sound from phonographic records or the like.

Various devices have been utilized in the past to reproduce sound either directly or by the generation of electrical impulses dependent on the character of the sound to be transmitted. Some of these devices involve the use of parts that are moved in accordance with the contour of a record, such as the groove of a phonographic record. Where the use of moving parts is involved, difficulty is frequently encountered due to sound distortion produced by the natural period of the system. In accordance with my invention, this difficulty is avoided by the use of a piezo electric element having a natural period which may be made well above the important acoustic range so that a potential which varies in accordance with the contour of the record is obtained.

My invention will be better understood from the following description when considered in connection with the accompanying drawings and its scope will be pointed out in the appended claims.

Referring to the drawings, Figs. 1 and 2 show various details of a pick-up device constructed in accordance with my invention, a part of the device being cut away to show the arrangement and construction of its various parts; Figs. 3 and 4 show certain features of the piezo electric element utilized in the pick-up device; and Fig. 5 shows a sound reproducing system wherein my invention is embodied.

Figs. 1 and 2 show a pick-up device comprising insulation cover plates 1, 2 and 3, and a conductive member 4 which is provided at one end with a wedge-shaped portion 5 and at the other end with a flange 6. In Fig. 1, the pick-up device has been illustrated partly in section with the cover plate 3 removed in order more clearly to show the various parts of the device. It will be observed that the insulation cover members 1, 2 and 3 together with the electrode or conductive member 4 form a container within which are mounted a piezo electric element 7, an electrode 8 of tin foil or the like, insulating members 10 and 11, and a resilient member 9. The electrodes 8 and 4 are provided with terminals 12 and 13 through which they are respectively connected to the conductors 14 and 15 of a low capacity cable comprising an insulation conduit 16 interposed between the conductors.

A member 17 adapted to be attached to the end of the member 4 by means of screws 18 is provided for holding a rocker member 19 against the knife edges 5 and 20. The member 19 is provided with a pair of grooves, one of which is arranged to co-operate with the edge of the wedge-shaped portion 5 and the other of which is arranged to co-operate with the edge of a wedge-shaped member, or knife edge, 20, mounted between the insulating member 11 and the rocker member 19. The member 19 is also provided with resilient bearings 21 consisting of rubber plugs or the like which give sufficient pressure to hold the member 19 always in contact with the knife edges 5 and 20 for the reception of the useful acoustic forces transmitted to it through the deflection of the needle 24. Set screws 25 threaded into the openings 26 of the member 17 may be provided for adjusting the pressure exerted through the resilient bearings 21 to hold the rocker member 19 in contact with the edges of the wedge-shaped member 20 and projection 5. It will be apparent that with this construction, movement of the stylus 24 will rock the member 19 about the edge of the projection 5 and vary the pressure exerted on the edge of the piezo electric element 7 through the wedge-shaped member 20 and the insulation member 11.

It is known that, when mechanical pressure is applied to a piezo electric material, electrical charges of opposite polarity will appear on certain portions of the surface. The piezo electric element should be cut from the crystal in such a way that the greatest change in potential between its lateral faces is produced when pressure is applied to a pair of its opposed edges. The size of the element should be such as to bring the natural period well above the frequency range of the sound to be reproduced.

The method of cutting the crystal will depend on the type of piezo electric element employed. Quartz, tourmaline, and Rochelle salt, for example are all piezo electrically active but the method of cutting from the crystal may differ in each case. Rochelle salt is preferred for the present application, because of its very large piezo electric activity.

Detailed instructions will therefore be given for cutting the piezo electric element 7 in such a manner as to obtain the maximum effect. Figs. 3 and 4 show a typical Rochelle salt crystal with the faces lettered in the usual manner. The various faces may be readily identified in any actual case by measuring the angles and comparing with the values shown in Fig. 3. Certain of the faces may be so small that they are not readily apparent but this presents no great difficulty. Having located the $a$, $b$ and $c$ faces which are mutually perpendicular a slab of suitable thickness, shown dotted in Figs. 3 and 4, is cut perpendicular to the "$c$" and "$b$" faces and parallel to the "$a$" face. Such a slab is illustrated in Fig. 4. The element is then cut from this slab by cutting perpendicular to the "$a$" face and 45° from the "$c$" and "$b$" faces, as shown in Fig. 4. Several such pieces can of course be cut from a single crystal depending on the size required. I have found pieces about ¼" x ¾" x ¾" satisfactory for the present purpose. Various well understood design considerations such as lead capacities, etc., will of course determine the most efficient size of the piezo electric element for any particular use.

In the case of piezo electric elements made from Rochelle salts, it has been found that dehydration and deterioration of the element are likely to be produced if its surfaces are left in a roughened condition. This may be prevented, in a large measure, by etching the crystal surface with water and polishing it with a soft cloth, thus producing a molecular surface layer by which the water of crystallization is retained in the element. A further protection is afforded by coating the element with shellac varnish, or rubber cement, etc. and sealing it up in the tight, box-like structure, as shown in Fig. 1.

Fig. 5 shows a system wherein the piezo electric pick-up device is utilized to operate a device shown as a loud speaker 28 in accordance with the configuration of the grooves in a phonographic record 29. This system comprises a potentiometer device shown as a resistor 30 which is connected across the terminals of the pick-up device to provide a suitable intensity control. Any desired proportion of the alternating potential difference may then be applied between grid 32 and cathode 33 of the triode 31. Suitable negative bias is obtained for the grid 32 of the triode 31 through the potential drop produced by the current to anode 34 through the resistance 41. The variations in the anode potential of tube 31 are impressed between the grid 36 and cathode 37 of tube 35 in the usual manner by virtue of the plate resistance 46, coupling condenser 45, and grid leak 44. The bias for the power tube 35 is obtained by the potential drop produced by the current to anode 38 through resistance 42. The large condensers 48 and 49 are shunted around the biasing resistances to eliminate the deamplifying effect which would otherwise be present with this system of biasing. The rheostat 40 is provided for filament control and the filament and plate currents are supplied from the batteries 39 and 43. A transformer 47 is inserted in the plate circuit of tube 35 which feeds the loud speaker 28.

The operation of the pick-up device and system will be readily understood from the following discussion. As the record or disc 29 is rotated the end of the needle 24 will be deflected to and fro. The deflecting force felt at the needle will be magnified by the knife edge mounted lever system 24, 19, 5 and 20 with the result that a much larger force will be applied to the piezo electric element 7. With such a device the force applied to the piezo electric element will be proportional to the deflection of the needle, that is to the amplitude of the groove in the record. It follows that the open circuit voltage developed between the electrode 8 and block 4 (i. e. with the cables 14, 15 and 16 and resistance 30 disconnected, or having high impedance values compared with the piezo electric element impedance) will be proportional to the amplitude of the groove on the record and independent of frequency. This characteristic of the above described piezo electric pick-up device would not give a flat frequency response when used on the records which are now in general use, but would tend to exaggerate the low frequencies. The present system of cutting records is such as to give approximately a constant needle velocity for a constant applied sound wave pressure over the important acoustic range. For use with the velocity type of groove the above pick-up device may be made to give a flat frequency response by making the load resistance 30 low compared with the capacity reactance of the crystal circuit. In this case the charge liberated by the pressure on the piezo electric element flows freely through the resistance and the current or voltage across the leak resistance 30 is proportional to the rate of change which in turn is proportional to the needle velocity. I have found that a resistance of the order of 200,000 to 1,000,000 ohms will give a satisfactory response characteristic. The higher frequencies and therefore the scratch noise may be controlled to a considerable extent by the selection of the resistance value 30. A high resistance value will cut off the high frequencies. For other systems of record cutting the appropriate circuit characteristics will be readily appreciated by those skilled in the art.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:—

1. The combination of a piezo electric element, conductive members adjacent the opposed surfaces of said element, and means comprising a stylus holder operable to apply a variable pressure to an edge of said element for producing between said members an electromotive force which varies in accordance with the movement of said stylus holder and a pair of resilient members arranged to bias said holder to a predetermined position.

2. A pick-up device comprising a piezo electric element, electrodes adjacent the lateral surfaces of said element, movable means operable to cause a variable pressure to be applied to an edge of said element, a support for said movable means, and resilient means mounted between said support and said movable means for biasing said movable means to a predetermined position.

3. A pick-up device comprising a piezo electric element, electrodes adjacent the lateral surfaces of said element, a movable member pivoted on an edge of one of said electrodes, a support for said movable member, resilient means mounted between said support and said movable member for biasing said movable member to a predetermined position, and movable means mounted between said element and said member for applying to an edge of said element a pressure which varies in accordance with the movement of said member.

4. The combination of a piezo electric element, electrodes located adjacent the lateral surfaces of said element and provided with terminals, a stylus holder, a support for said holder, resilient means for biasing said holder to a predetermined position, and means mounted between said holder and an edge of said element for applying to said edge a pressure which varies in accordance with the movement of said holder.

5. The combination of a piezo electric element, electrodes located adjacent the lateral surfaces of said element and provided with terminals, a stylus holder, a support for said holder, resilient means for biasing said holder to a predetermined position, and a pivoted member interposed between said resilient means and an edge of said element for applying to said edge a pressure which varies in accordance with the movement of said holder.

6. The combination of a piezo electric element, electrodes located adjacent the lateral surfaces of said element and provided with terminals, a stylus holder, a support for said holder, resilient means for biasing said holder to a predetermined position, and a connection between said holder and an edge of said element comprising a member pivoted on an edge of one of said electrodes for producing between said electrodes a potential which varies in accordance with the movement of said holder.

In witness whereof, I have hereunto set my hand this 23d day of July, 1926.

CHESTER W. RICE.